United States Patent [19]

Fontaine

[11] Patent Number: 5,516,138
[45] Date of Patent: May 14, 1996

[54] LOCK AND RELEASE MECHANISM FOR FIFTH WHEEL

[75] Inventor: John P. K. Fontaine, Birmingham, Ala.

[73] Assignee: Fontaine Fifth Wheel Co., Birmingham, Ala.

[21] Appl. No.: 398,765

[22] Filed: Feb. 6, 1995

Related U.S. Application Data

[63] Continuation-in-part of Ser. No. 365,807, Dec. 29, 1994, Pat. No. 5,456,484.

[51] Int. Cl.$^6$ .................................................. B62D 53/12
[52] U.S. Cl. ................................................................. 280/434
[58] Field of Search .................................. 280/433, 434, 280/435, 436, 437, 438.1, 441.1

[56] References Cited

U.S. PATENT DOCUMENTS

| | | | |
|---|---|---|---|
| 2,371,750 | 3/1945 | Fontaine | 280/434 |
| 2,471,854 | 5/1949 | Bies et al. | 280/433 |
| 2,553,959 | 5/1951 | Cook et al. | 280/407.1 |
| 2,623,753 | 12/1952 | Madigan | 280/421 |
| 2,835,504 | 5/1958 | Acker | 280/81.1 |
| 2,998,267 | 8/1961 | Zajac et al. | 280/427 |
| 3,239,240 | 3/1966 | Palmer | 280/434 |
| 3,318,616 | 5/1967 | Fontaine | 280/434 |
| 3,535,679 | 10/1970 | Connors | 280/434 X |
| 3,630,545 | 12/1971 | Fontaine | 280/434 |
| 3,815,937 | 6/1974 | Hodgson | 280/434 |
| 3,844,584 | 10/1974 | Fontaine | 280/434 |
| 4,106,793 | 8/1978 | Neff | 280/435 |
| 4,140,328 | 2/1979 | Fontaine | 280/434 |
| 4,429,892 | 2/1984 | Frampton et al. | 280/407 |
| 4,700,966 | 10/1987 | Hawkins et al. | 280/432 |
| 4,907,815 | 3/1990 | Hunger | 280/435 |
| 4,946,183 | 8/1990 | Benson et al. | 280/434 |
| 5,028,067 | 7/1991 | Madura | 280/434 X |

FOREIGN PATENT DOCUMENTS

| | | | |
|---|---|---|---|
| 1234962 | 6/1971 | United Kingdom | 280/434 |

*Primary Examiner*—Kevin T. Hurley
*Attorney, Agent, or Firm*—Jacobson, Price, Holman & Stern

[57] ABSTRACT

A mechanism for locking and unlocking of a king pin of a fifth wheel. The mechanism includes a jaw member, a wedge member, a bumper member and a lever member interconnecting the jaw member, the wedge and the bumper member. A handle member includes a handle extension member. The system may be operated by a two-way air cylinder, a one-way air cylinder or in an alternate embodiment, may be incorporated into an existing manually operated fifth wheel system as a retrofit assembly so as to convert existing fifth wheel locking mechanisms to the arrangement of the present invention.

13 Claims, 9 Drawing Sheets

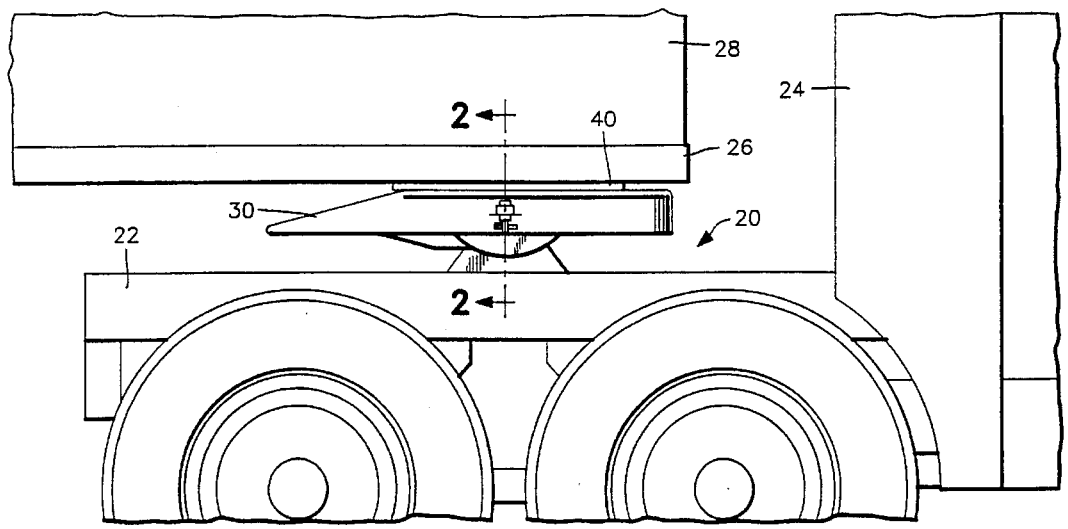
FIG. 1
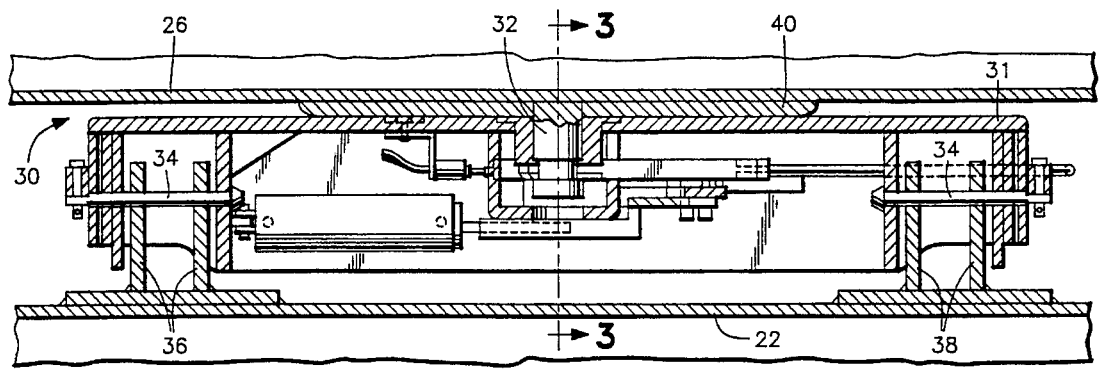
FIG. 2
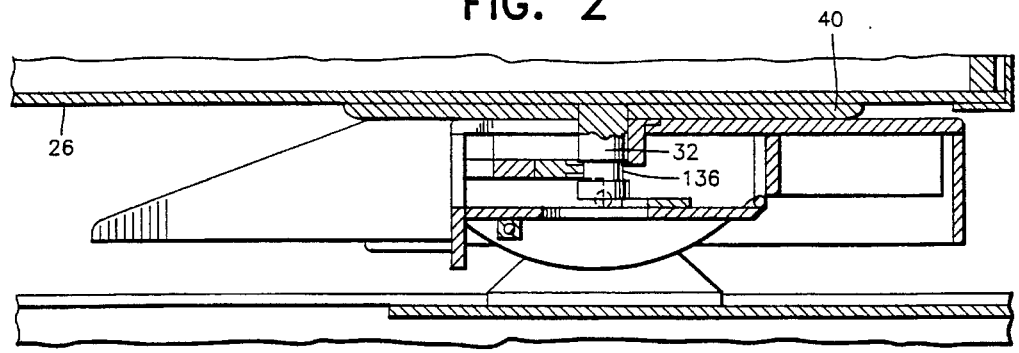
FIG. 3
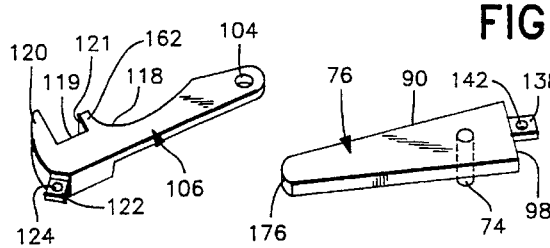
FIG. 7
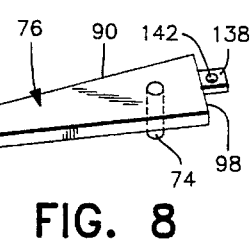
FIG. 8
FIG. 9
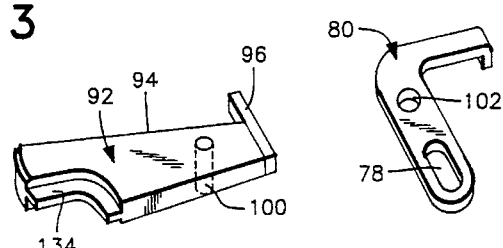
FIG. 10

LOCK AND RELEASE MECHANISM FOR FIFTH WHEEL

This application is a continuation-in-part application of U.S. application Ser. No. 08/365,807, filed Dec. 29, 1994, now U.S. Pat No. 5,456,484.

FIELD OF THE INVENTION

This invention relates to a mechanism for locking fifth wheels of a truck tractor and more particularly to an improvement in that type of mechanism which includes a wedge member, a jaw member, a bumper member and a lever member for locking the fifth wheel about the king pin of a tractor trailer.

BACKGROUND OF THE INVENTION

In the art to which this invention relates it has been customary to hold the jaw of the fifth wheel into contact with the king pin by means of a slidable wedge. The wedge was held in place between a part of the frame of the fifth wheel and the off-king pin side of the jaw. Means is provided to unlock the mechanism by first moving the wedge to a retracted position followed shortly thereafter by movement of the jaw, permitting the king pin to be removed from the fifth wheel.

In some instances it has been found that the wedge was jammed so tightly in place that it was impossible to remove the same by means of the usual handle associated therewith. Further, in prior apparatus it has been necessary to limit the inward movement of the wedge so that in the event the king pin became oval shaped in the fore and aft direction of normal movement of the vehicle, there would be no over-stressing of the parts when the tractor turned at substantially right angles to the trailer. In other words, when a king pin becomes worn it wears somewhat oval shaped in the fore and aft, normal towing direction of the vehicle. If the wedge continues to be forced inwardly, when it is permitted to move inwardly, thus to move the jaw closer to the king pin, then, when the tractor is maneuvered so as to be substantially at right angles to the trailer, as when parking for unloading, etc., excessive force is placed upon the parts, causing undue stress on the several parts including the king pin, jaw and wedge and associated frame parts.

The state of the art can be traced from my father's U.S. Pat. No. 2,371,750, through my U.S. Pat. Nos. 3,318,616, 3,844,854, 3,630,545, and most recently, in my U.S. Pat. No. 4,140,328. In the '328 patent, means is disclosed to provide access from the exterior of the fifth wheel for freeing a jammed or stuck wedge. A rod like member is mounted for sliding movements in the depending or vertically disposed portions of the frame of the fifth wheel. The member is threaded for a length adjacent its outer end and a spring is interposed between two of the depending frame members. A nut is provided adjacent the spring so that the location of the inner end of the member relative to the end of the wedge may be adjusted. By simply striking the projecting outer end of the member, the entire member moves inwardly, thus freeing the jammed wedge from the exterior or outside of the fifth wheel.

The current state of the art using a jaw and wedge has a handle that has slots which contact studs in the jaw and wedge. The slot for the wedge allows approximately one and one-half inches of motion when the handle is secure in a locked position and has a tendency to squirt when grease and dirt get between the contacting surfaces of the jaw and wedge. This action can cause the wedge to strike the handle with force towards the open position.

SUMMARY OF THE INVENTION

By the present invention, a simpler, more direct mechanism for locking and unlocking of a king pin of a fifth wheel is provided. The mechanism includes a jaw member, a wedge member, a bumper member and a lever member interconnecting the jaw member, the wedge and the bumper member. The system may be operated by a two-way air cylinder, a one-way air cylinder or in an alternate embodiment, may be incorporated into an existing manually operated fifth wheel system as a retrofit assembly so as to convert existing fifth wheel locking mechanisms to the arrangement of the present invention.

My present invention uses a constant force spring which applies sufficient force directly against the wedge to prevent slipping or squirting of the wedge towards the open position in contrast to the old handle arrangement which would let the wedge move an inch or more before striking the handle. The prior use of a coil spring with insufficient pressure on the wedge to prevent slippage when grease or dirt get between the contracting surface of the jaw and wedge is replaced in the present invention by the use of a constant force spring or air pressure which would double or triple the force used in holding the wedge secure in a closed position.

In addition, a plurality of plunger micro-switches are installed to provide an indication of proper seating of the king pin as well as the wedge member. An electrical indication of the position of the king pin as well as the wedge member are transmitted to the cab of the tractor for continuous monitoring of the locked condition of the fifth wheel assembly.

By the present invention, a simpler, safer and easier operating assembly is provided. An air cylinder is used to lock the fifth wheel and may optionally be used to unlock the fifth wheel or alternatively the force of a constant force spring may be used to couple the fifth wheel. This invention eliminates "squirting" which is the tendency of the wedge to shift relative to the jaw when a load is applied to the jaw by the king pin of a towed vehicle.

The present invention eliminates the use of small steps machined on the contacting surfaces of the jaw and wedge which were designed to prevent slippage. When wear occurred on these steps, squirting would occur and replacement of the jaw and wedge was necessary. These steps are not necessary by the present invention.

By connecting an operating handle directly to the wedge member in a straight line orientation, considerable leverage is possible in withdrawing the wedge should it become "jammed" for any reason such as failure of the air cylinder operation by threading of the handle on an area exterior to the fifth wheel with a nut included on the threaded portion of the handle which will allow rotation of the nut against the exterior surface of the fifth wheel to free any jamming of the wedge. The direct attachment of a handle to a wedge member in a straight configuration provides for the handle to be supported by at least three portions (plates) of the fifth wheel making it unlikely that a flying tread from a tire could cause damage to the handle to make it unworkable.

Accordingly, it is an object of the present invention to provide a lock and release mechanism for a fifth wheel which includes a jaw member, a wedge member and a lever member used with a two-way air cylinder, and preferably with a one-way air cylinder or alternatively in a manual operation.

It is another object of the present invention to provide a lock and release mechanism for a fifth wheel which includes a jaw member, a wedge member and a lever member used with a two-way air cylinder, and preferably with a one-way air cylinder or alternatively in a manual operation with an operating handle connected in a straight line orientation with the wedge member.

It is yet another object of the present invention to provide a lock and release mechanism for a fifth wheel which includes a jaw member, a wedge member and a lever member used with a two-way air cylinder, and preferably with a one-way air cylinder or alternatively in a manual operation with an operating handle connected in a straight line orientation with the wedge member and including electrical sensors to detect proper seating of the king pin and the wedge member with an indication of the proper seating of these members being transmitted to the cab of the tractor.

It is yet another object of the present invention to provide a lock and release mechanism for a fifth wheel which includes a jaw member, a wedge member and a lever member used with a two-way air cylinder, and preferably with a one-way air cylinder or alternatively in a manual operation with an operating handle connected in a straight line orientation with the wedge member and including electrical sensors to detect proper seating of the king pin and the wedge member with an indication of the proper seating of these members being transmitted to the cab of the tractor and the operating handle being threaded exteriorly of the fifth wheel mechanism and including a nut rotatably mounted on the threaded portion of the operating handle for an emergency release of the wedge member.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 1 is an elevational view of a fifth wheel assembly interconnecting a tractor cab and a trailer.

FIG. 2 is a cross sectional view of the fifth wheel assembly according to the present invention taken along line 2—2 of FIG. 1.

FIG. 3 is a longitudinal sectional view taken along line 3—3 of FIG. 2.

FIG. 7 is a perspective view of the bumper member.

FIG. 8 is a perspective view of the wedge member.

FIG. 9 is a perspective view of the jaw member.

FIG. 10 is a perspective view of the lever member.

DETAILED DESCRIPTION OF THE PREFERRED EMBODIMENTS

Figure 4:
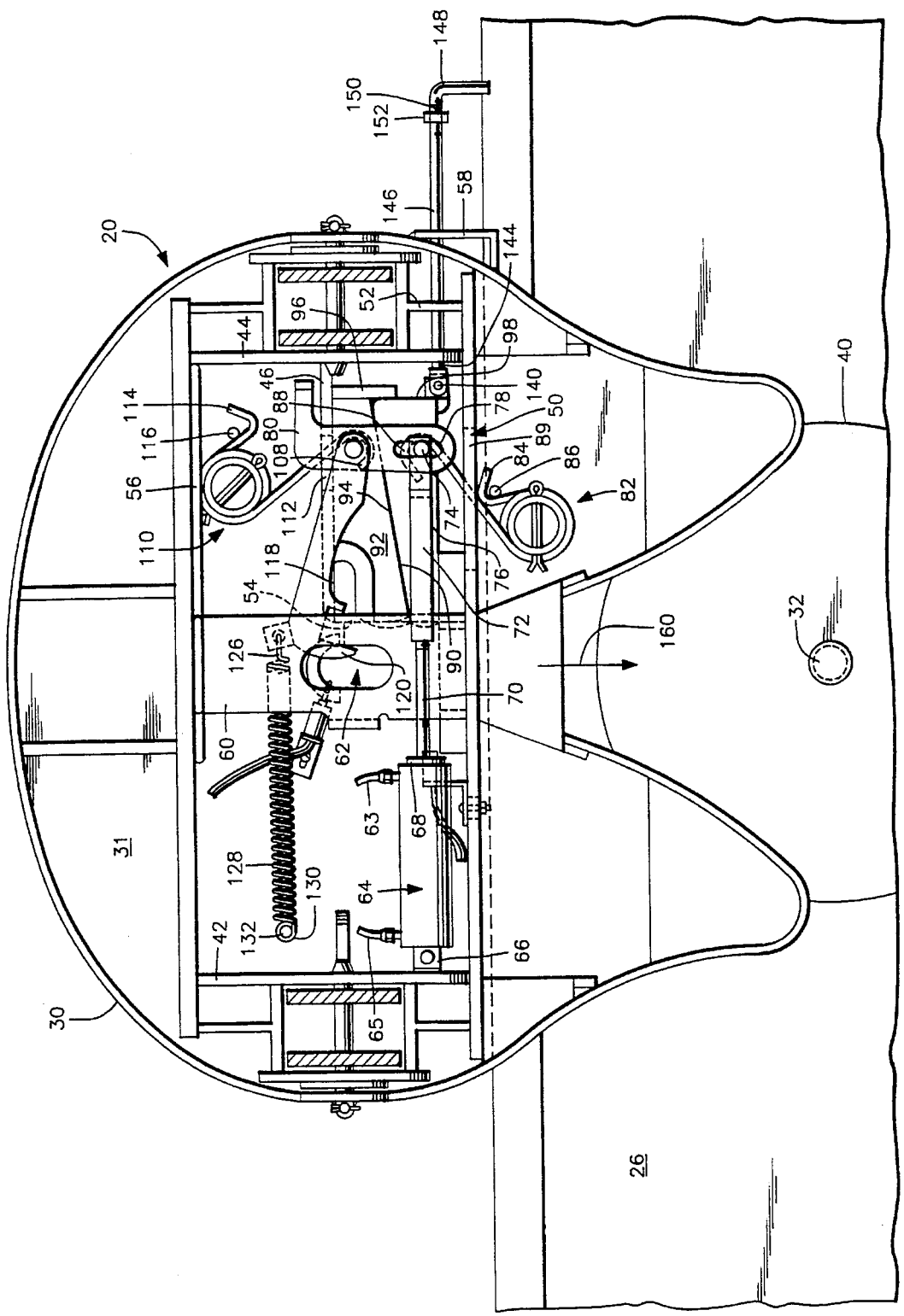
FIG. 4 is a bottom plan view of the fifth wheel assembly according to the present invention in a set to couple mode.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIGS. 1 through 6, in particular, a lock and release mechanism for a fifth wheel king pin embodying the teachings of the subject invention is generally designated as 20. With reference to its orientation in FIG. 1, the mechanism 20 is interposed between a frame rail 22 of a tractor 24 and the platform 26 of a trailer 28. A fifth wheel housing 30 is mounted on the frame rail 22 with a king pin 32 extending vertically downwardly from the platform 26 of the trailer 28. The king pin 32 extends downwardly from a top plate or fifth wheel plate 40 which is preferably of a low friction material so as to facilitate turning or rotation of the trailer with respect to the fifth wheel mechanism mounted on the trailer. The housing 30 is pivotally mounted by pivot pins 34 on brackets 36, 38 located on opposite sides of the frame rail 22.

In the assembly according to the present invention, as shown in FIG. 4, in the set to couple position, the fifth wheel housing 30 includes a plurality of plates 42, 44, 46, 50, 52, 54 and 56 extending vertically downwardly from top plate 31 of the housing 30. In addition, L-shaped plate 58 extends outwardly from a side of housing 30. Cover plate 60 extends between plates 50 and 56 and defines a bottom surface of a throat region 62 for receipt of the king pin.

In the assembly shown in FIG. 4, two-way pneumatic piston cylinder 64 is anchored at one end 66 on plate 42. Piston rod 70 extends from opposite end 68. Piston rod 70 terminates in piston rod extension 72, coupled to pivot pin 74 extending upwardly from wedge member 76 and through elongated groove 78 of lever member 80.

A constant force spring assembly 82 is fixed to top plate 31. One end of the spring 84 engages pin 86. The opposite end 88 extends through an opening in plate 50 and engages pin 74 of the wedge member.

Resting on top of angled surface 90 of wedge member 76 is jaw member 92 having an edge 94 extending at the same angle as angled surface 90 of wedge member 76. A terminal projection 96 of the jaw member 92 engages with a trailing surface 98 of the wedge member 76. Jaw member 92 also includes a stepped engagement projection 134 for engaging a recessed area 136 of king pin 32.

The jaw member 92 includes a projecting pin 100 which extends through circular opening 102 in the lever member 80 and engages a circular opening 104 in bumper member 106. Also, a terminal end 108 of constant force spring assembly 110 is wrapped around pin 100 after passing through an opening 112 in plate 46. An opposite end 114 of spring assembly 110 is held in position by pin 116 projecting downwardly from plate 31.

Bumper member 106 includes camming surface 118 and terminal projection 120. Bumper member 106 includes a channel 119 having a leading surface 121 for engagement with wall plate 54 in a set to couple position. Also, a spring connection projection 122 includes opening 124 for receipt of end 126 of spring 128 anchored at end 130 on a pin 132 extending downwardly from the top plate 31.

Connected to projection 138 of wedge member 76 by pin 140 extending through opening 142 is end 144 of operating handle 146. At an opposite terminal end 148 of handle 146 is a threaded portion 150 having a nut 152 threadably secured thereon. Handle 146 extends through openings in plates 44, 52 and the side wall of the housing 30 and ultimately through L-shaped bracket 58. The handle 146 is thereby supported at several locations spaced along its length to ensure an accurate and straight sliding of the handle along its length.

Piston cylinder unit 64 includes air hoses 63 and 65 for controlling air flow to the unit 64 from the cab of the tractor. Remote control of the air cylinder is thereby provided for extension or retraction of the piston rod 70 so as to lock or release the king pin.

In operation of a preferred embodiment of the invention, the fifth wheel mechanism 20, as shown in FIG. 4, mounted on a tractor is backed up by the tractor in a direction of arrow 160 towards king pin 32 located on the bottom of a platform 26 of a trailer 28. The fifth wheel mechanism 20 is initially positioned in a set to couple position.

Figure 5:
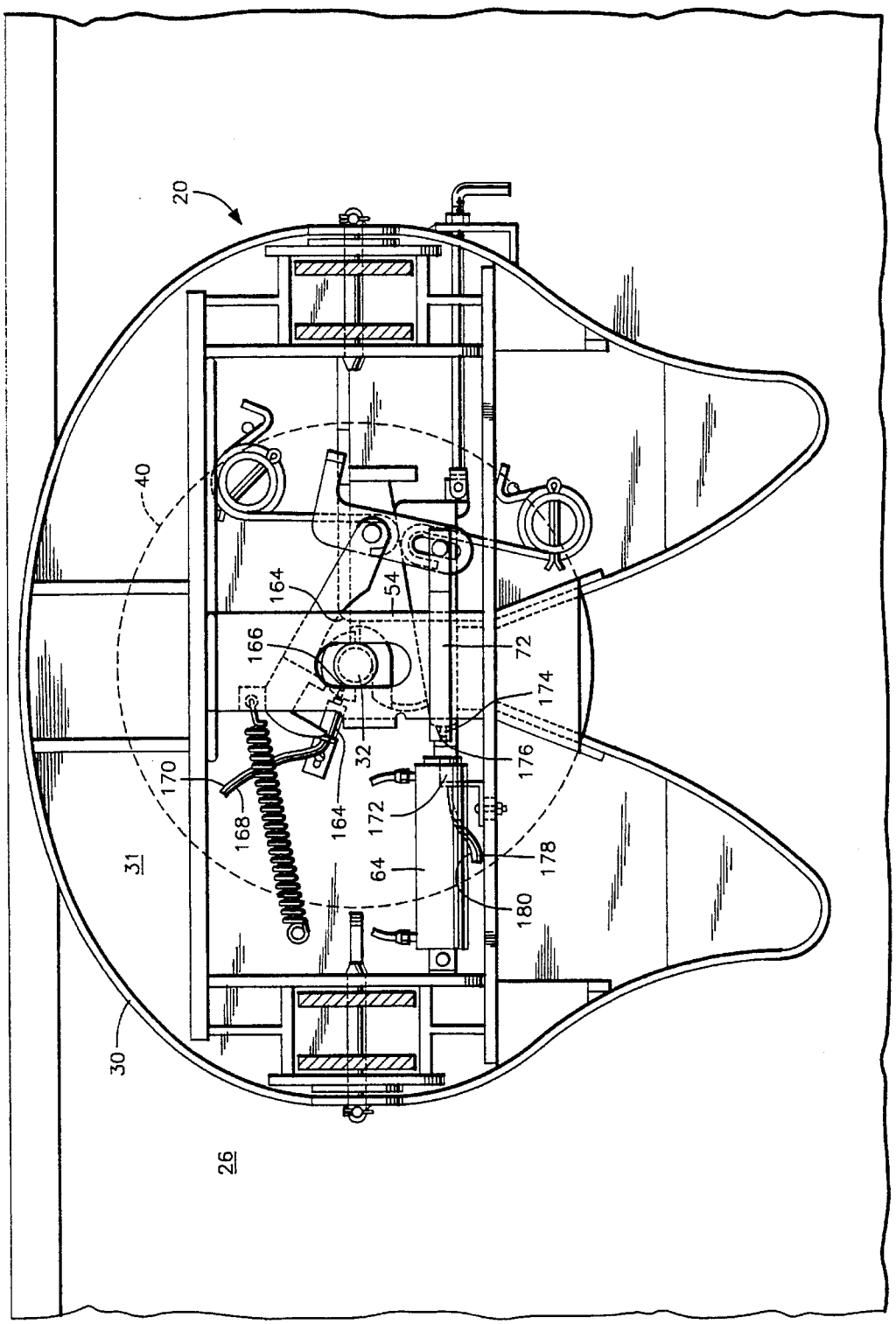
FIG. 5 is a bottom plan view of the fifth wheel assembly according to the present invention in a locked mode.

Now looking at FIG. 5, as the tractor backs up, the king pin 32 enters the throat 62 of the mechanism thereby engaging the projection 120 of the bumper member 106. The bumper member is thereby moved in a direction opposite to the direction of arrow 160 until projection 162 having leading edge 121 slides up past the terminal end 164 of plate 54. Once the leading edge 121 of projection 162 is clear of the end 164 of plate 54, the spring 128 pulls the bumper member by a bias force in a direction towards fixed pin 132. The bumper 106 continues to be pulled by spring 128 with camming surface 118 engaging end 164 to guide the bumper out of the way of the king pin 32 entering the throat 62.

Meanwhile, once the king pin 32 is seated in the throat 62, piston cylinder 64 is activated to retract piston rod 70 and piston rod extension 72 into the piston cylinder 64. By the connection of pin 74 to piston rod extension 72, the wedge member 76 is drawn laterally to wedge jaw member 92 against the recessed area 136 of king pin 32. Jaw member 76 is simultaneously being drawn into engagement with the king pin by the force of the retraction of the bumper member as caused by the spring 128. However, due to the engagement of the terminal projection 96 of the jaw member 92 with the trailing surface 98 of the wedge member 76, the jaw member is prevented from engaging with the king pin until actuation of the piston cylinder unit 64 for forced movement of the wedge into engagement with the jaw member and lateral movement of the wedge member to the jaw member.

By the operation of the piston cylinder unit 64, the wedge member 76 is held in a locked position thereby preventing the jaw member from being backed off from engagement with the king pin. In addition, by the interconnection of the bumper member and the jaw member by pin 100, the bias force of spring 128 also assists in drawing the jaw member tight against the king pin for secure locking of the king pin in position once the piston cylinder unit 64 is actuated for movement of the wedge member. Additional bias force is provided by the spring assemblies 82, 110.

In the coupled position of FIG. 5, a micro-switch 164, having a spring depressible plunger 166, is engaged by the king pin and depressed so as to complete a circuit across wires 168, 170 connected to the tractor battery and a light in the cab of the tractor to activate the light and thereby indicate a correct positioning of the king pin in a locked position. In addition, micro-switch 172, having a spring depressible plunger 174, is engaged by edge 176 of the wedge member 76 so as to complete a circuit across wires 178, 180 connected to the tractor battery and a light within the cab of the tractor to activate the light and thereby indicate proper positioning of the wedge member in a locked position. Movement of the king pin or the wedge member away from the coupled position will move the plunger of the micro-switches 164, 172 to extend and break the circuit to cause the light in the cab of the tractor to be extinguished. This would thereby provide a warning to the operator that an unsafe condition may be present due to an improper positioning of either the wedge or the king pin.

Figure 6:
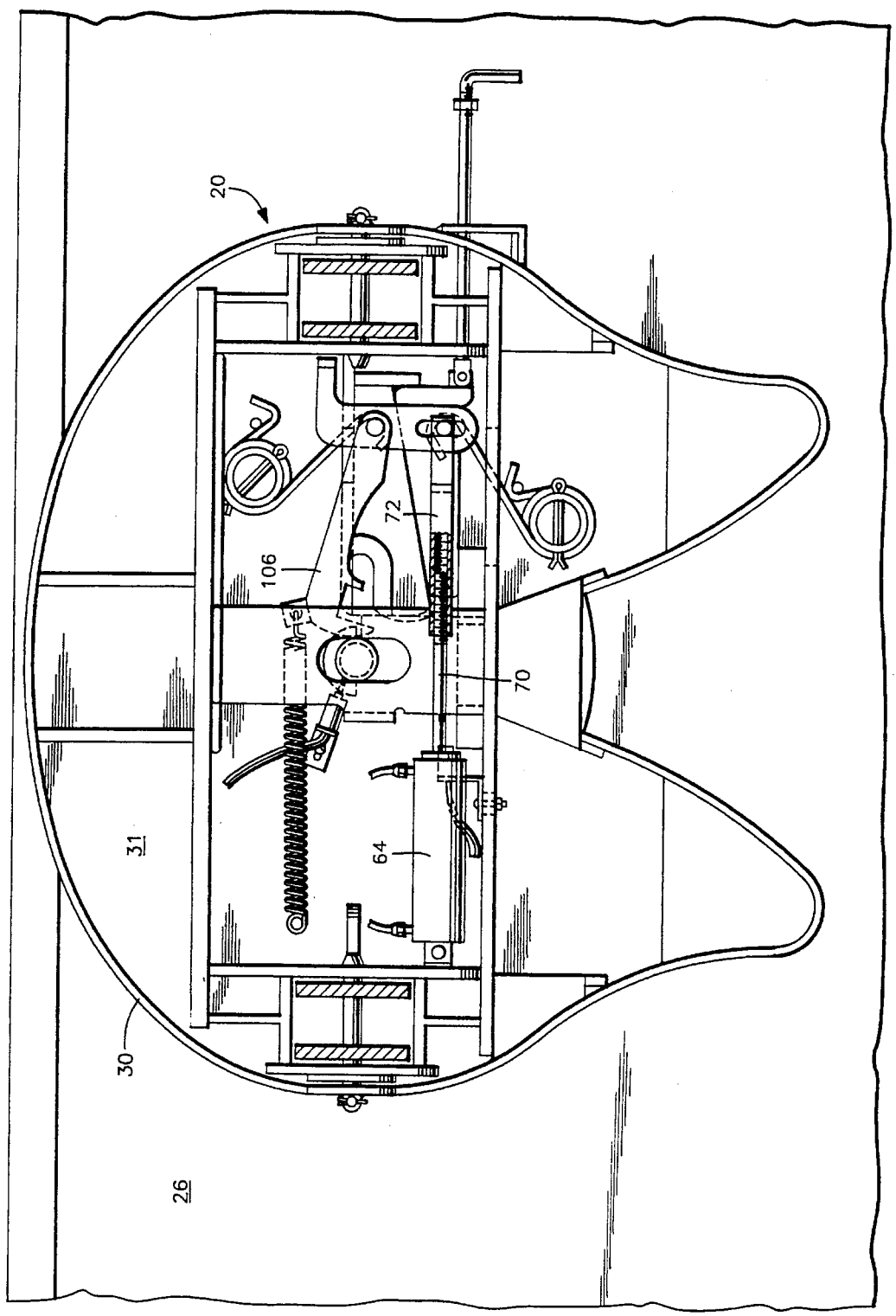
FIG. 6 is a bottom plan view of the fifth wheel assembly according to the present invention in a set to uncouple mode.

When the trailer is to be uncoupled, as shown in the set to uncouple position of FIG. 6, the piston cylinder unit 64 is actuated to extend the piston cylinder rod 70 and its extension 72 so as to move the wedge member 76 from its position as shown in FIG. 5, into engagement with the projection 96 of the jaw member so as to retract the jaw member from engagement of the king pin. Due to the interconnection of the bumper member with the jaw member through pin 100, the bumper member is withdrawn by the engagement with the terminal end 164 of plate 54 of first the camming surface 118, and then projection 162, down along leading surface 121 to engagement of end 164 with the base of channel 119 and ultimately to the position of the bumper member shown in FIG. 6. In this position, the king pin is free to move out of the throat 62 for uncoupling of the tractor from the trailer.

When the tractor is moved away from the trailer, the bias of spring 128 will cause the projection 120 of the bumper member 106 to move into the throat 62 as shown in FIG. 4. The mechanism is thereby set to the couple position, ready to receive a king pin.

In the event of failure of the piston cylinder unit 64, the spring assemblies 82, 110, having ends 88, 108 engaging pins 74 and 100, respectively, will force the jaw member 92 and wedge member 76 into the locked position as assisted by spring 128 through bumper member 106. Unlocking is accomplished by the use of end 148 of handle member 146 to pull back on the wedge member until engaging with projection 96 of the jaw member 92 and forcing the jaw member out of engagement with the king pin. If the jaw member and wedge member are locked or frozen in the coupled position with the king pin, it is possible to rotate nut 152 on threaded portion 150 to engage and push against plate 58 to unfreeze the locked position of the wedge member. Continued manual pulling on the handle member will act to free the jaw member and wedge member from engagement with the king pin.

Figure 11:
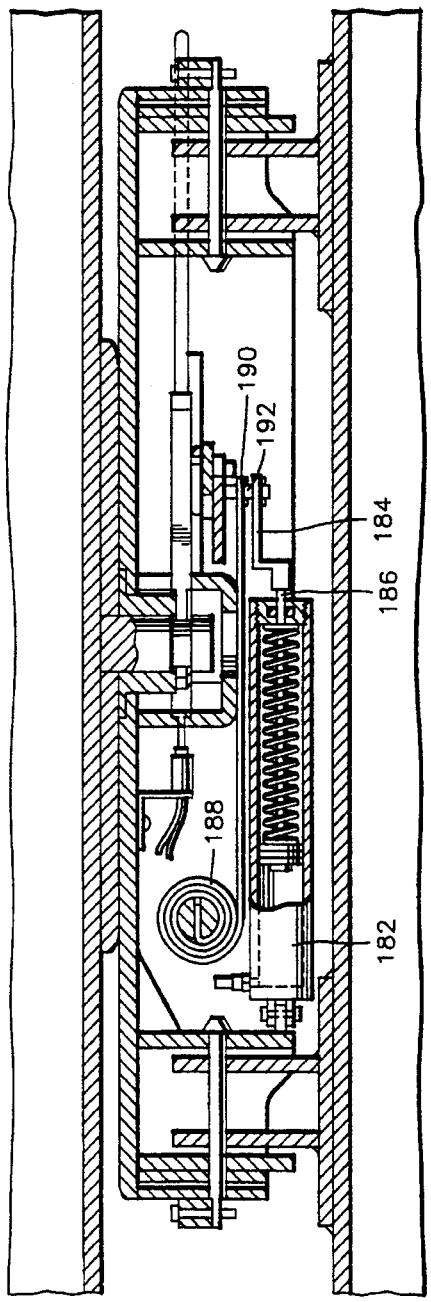
FIG. 11 is a partial sectional view similar to FIG. 2 and including the alternative mechanism of a mechanical return spring and a one-way air piston-cylinder arrangement.

In an alternative embodiment as shown in FIG. 11, a one-way piston cylinder unit 182 is used to extend an attachment 184 located at an end 186 of the piston rod so as to move the jaw member and wedge member out of the coupled position and into the set to uncouple position. In this embodiment, a coil return spring 188 having end 190 connected to a pin 192 in common with the attachment 184 is used to move the jaw member and wedge member to the locked or coupled position. In addition, the spring assemblies 82 and 110, as shown in FIG. 5 will provide a bias force to retain the jaw member and the wedge member in a locked position.

Figure 12:
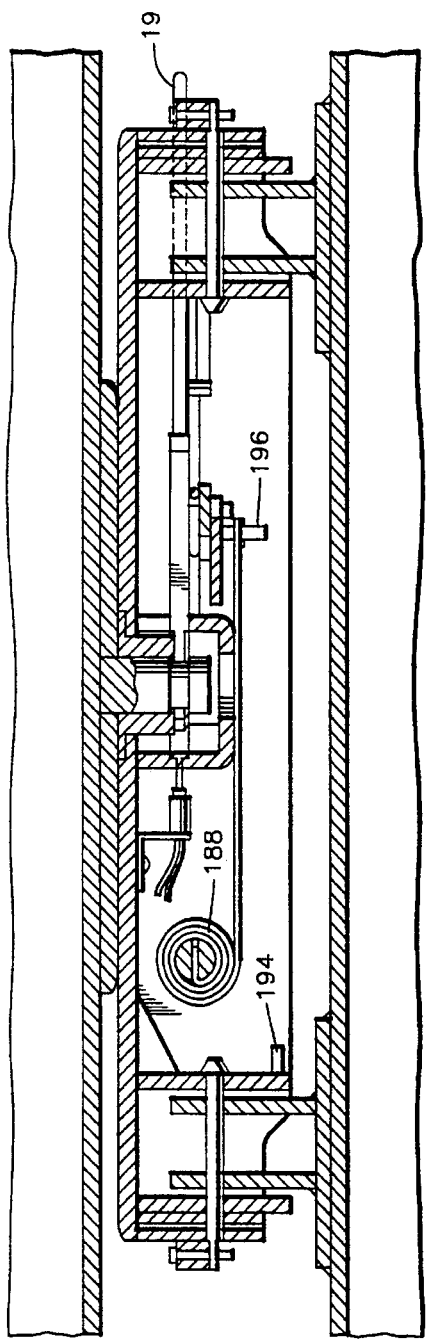
FIG. 12 is a sectional view of a manual locking and unlocking assembly including assembly brackets for insertion of a piston cylinder arrangement according to the present invention.

Alternatively, as shown in FIG. 12, a coil spring 192 is used to lock the assembly in the coupled position. It is understood that a manually operated handle could be used to uncouple the king pin from the assembly. It is envisioned in this embodiment in accordance with the present invention that a bracket 194 is positioned so that if desired, a one-way piston cylinder unit could be attached to the assembly for interconnection between the bracket 194 and pin 196 so as to operate in a manner consistent with that disclosed for FIG. 11.

Figure 13:
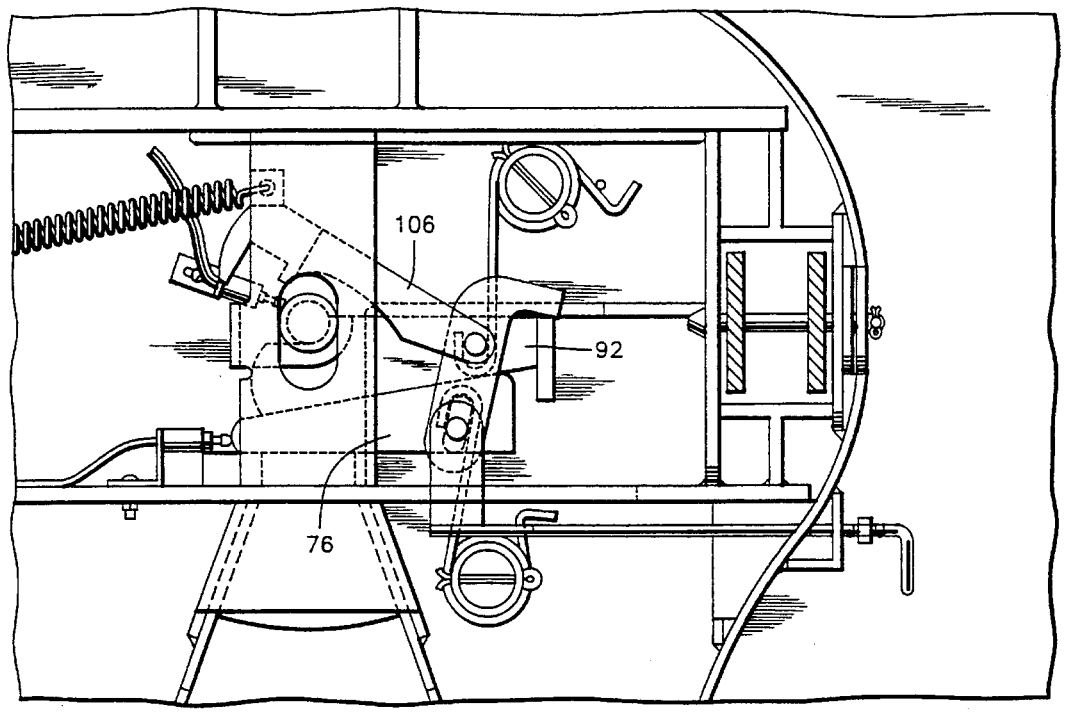
FIG. 13 is an alternative embodiment of the present invention for retrofitting existing fifth wheel assemblies with the components of the present invention shown set in a coupled position.
Figure 14:
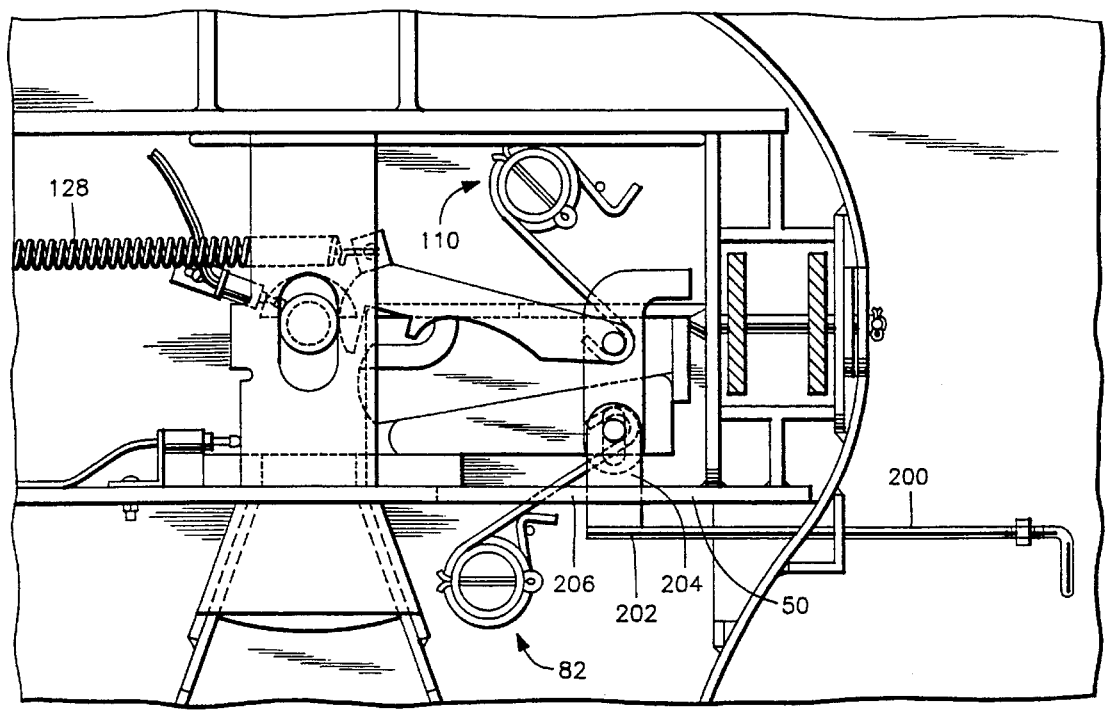
FIG. 14 is similar to FIG. 13 but is shown in a set to uncouple position.

It is also considered as being within the scope of the present invention to retrofit existing fifth wheel assemblies as shown in FIGS. 13 and 14 so as to include the jaw member 92, wedge member 76 and bumper member 106 arrangement. This is done by including these three members with an operating handle 200 having one end 202 secured to an extended lever member 204 which extends through a slot 206 in plate 50. The force of spring assemblies 82 and 110 as assisted by spring 128 would be used to move the jaw member and wedge member to a locked or coupled position whereas the handle 200 would be used manually to uncouple the jaw member and wedge member for uncoupling of the king pin from the assembly.

Figure 15:
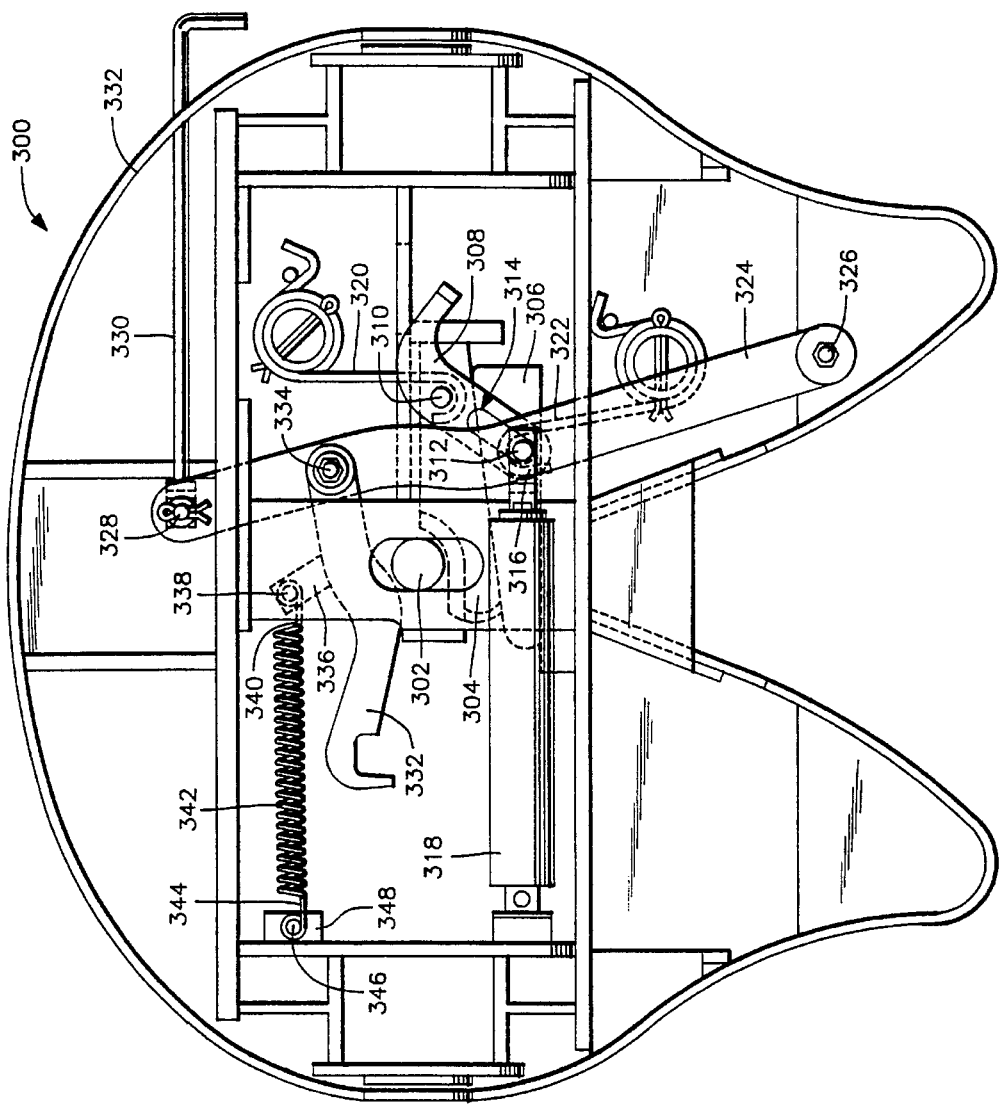
FIGS. 15 is a bottom plan view of another embodiment of the present invention, shown in the closed position.
Figure 16:
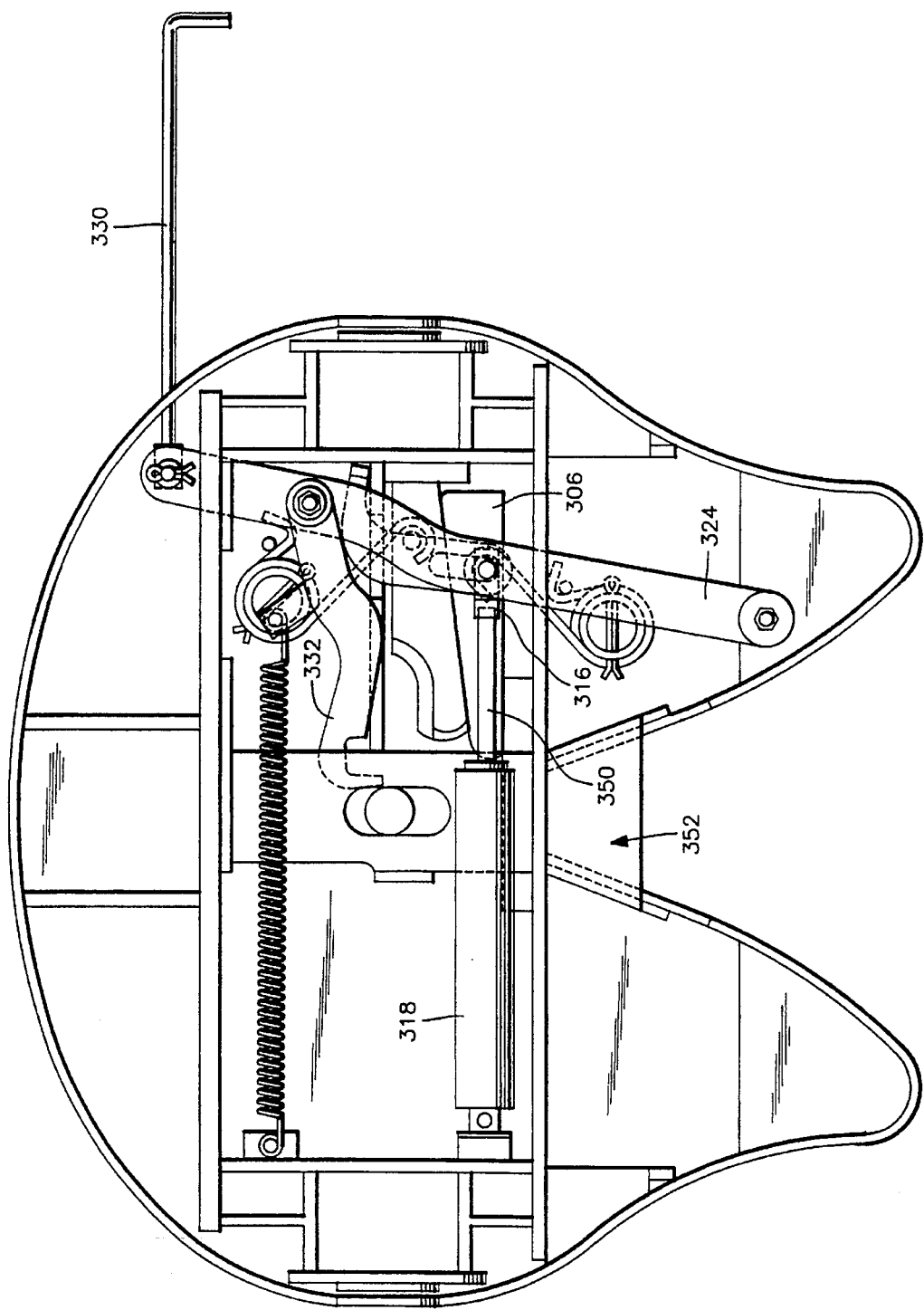
FIGS. 16 is a bottom plan view of the present invention as in FIG. 15, shown in the open position.

With reference to FIGS. 15 and 16, a lock and release mechanism for a fifth wheel king pin embodying the teachings of a preferred embodiment of the subject invention is generally designated as 300. With reference to its orientation in FIG. 15, the mechanism 300 is shown in the closed position locking a king pin 302 by a jaw member 304 as supported in place by a wedge member 306.

A lever member 308 is pivotally connected by a pin 310 to the jaw member 304. A pin 312 mounted on the wedge member 306 extends through an elongated slot 314 in the lever member and is also pivotally connected to an extension 316 of a piston cylinder assembly 318.

Two springs 320 and 322 are secured to the pins 310 and 312, respectively, to force the jaw member 304 and wedge member 306 into the locked position as maintained also by the retraction of the piston cylinder unit 318. The pin 312 is also pivotally mounted to an elongated handle extension 324 pivotally mounted about pin 326 at one end AND at an opposite end pivotally mounted by connection 328 to handle member 330, which extends through the housing 332 of the mechanism 300.

The handle member 330 may be used to manually unlock the mechanism 300 so that a bumper member 332 is moved to a set-to-couple position. The bumper member is also pivotally mounted at pin 334 to elongated handle extension 324. The bumper member includes an extension 336 which includes a hole 338 for anchoring one end 340 of spring 342. An opposite end 344 of spring 342 extends through a hole 346 of an anchor plate 348. The bumper member 332 is also biased to the position shown in FIG. 15 by the spring 342 which in turn transmits the bias force to the elongated handle extension 324.

To set the mechanism 300 to the open position, as shown in FIG. 16, the piston cylinder unit 318 may be activated to extend the extension 316 mounted at the end of piston rod 350 so as to move wedge member 306 away from the throat 352, through which the king pin slides in and out. The extension of the piston cylinder unit 318 is against the bias of springs 320, 322 as well as the spring 342. By the connection of the wedge member 306 and the elongated handle extension 324 through pin 312, the handle member 330 is forced to move out of the housing 332 upon release of the king pin. The bumper member 332 is then moved into the set-to-couple position as was explained with respect to the other embodiments.

In the event that the piston cylinder unit 318 is not operational, or in an alternative embodiment when the piston cylinder unit 318 is not present, the handle member 330 may be manually withdrawn. Due to the interconnection of the elongated handle member 324 with the lever member 308, wedge member 306 and bumper member 332, the jaw member 304 is withdrawn from the throat through the connection between the lever member 308 and jaw member 304 at pin 310. By linking the elongated handle extension 324 to the wedge member 306, approximately 1 and ½ inches of play in the wedge member is eliminated, which occurred previously with respect to the wedge in a locked and shut position. This play caused excessive wear and pounding of the handle was required with such force that the overall operation could potentially become unsafe. The embodiment depicted in FIGS. 15 and 16 may also have the arrangement shown in FIGS. 4, 5, 6 and 17 of a nut threadingly mounted on the handle to adjust the amount of movement of the handle.

Figure 17:
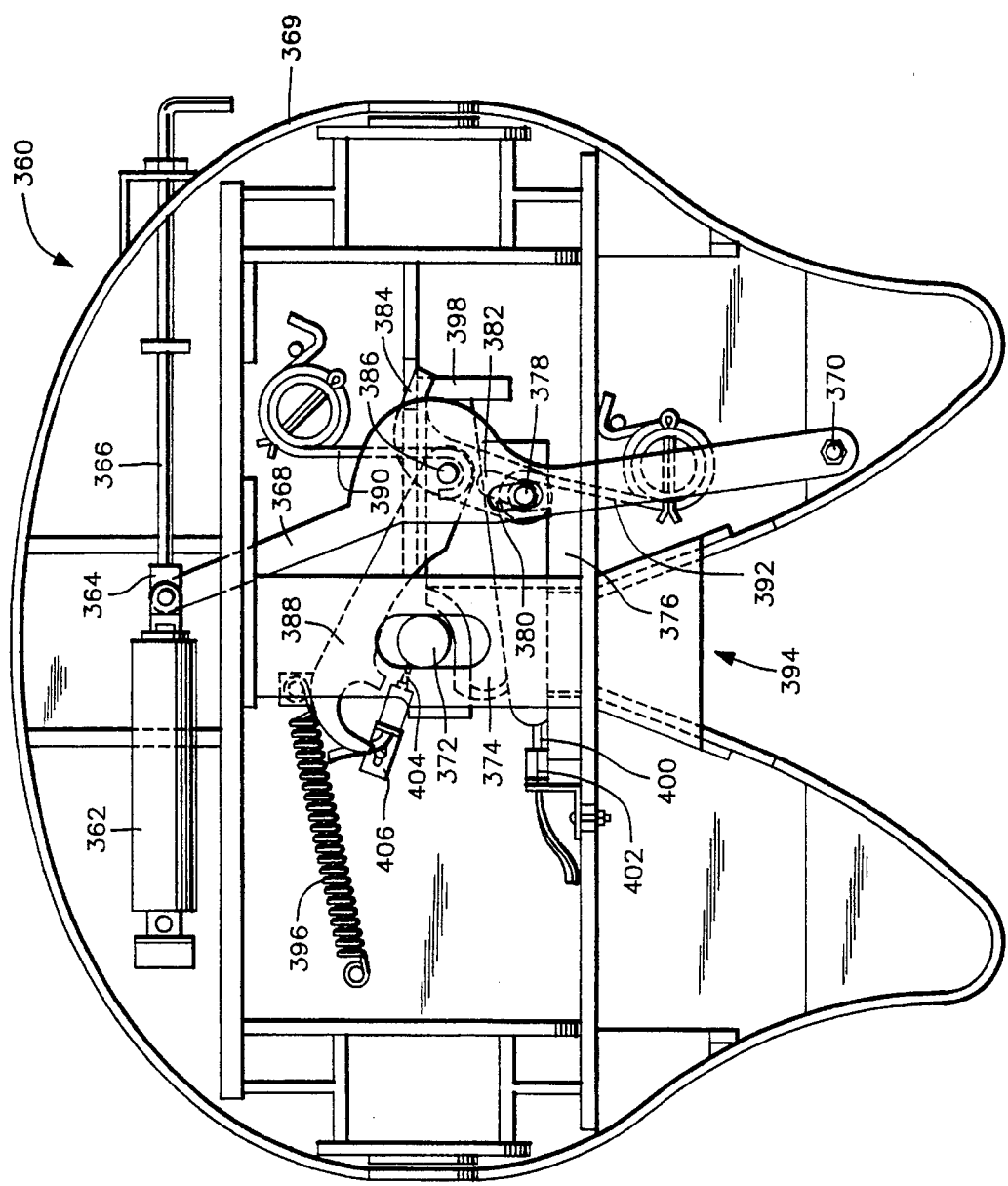
FIG. 17 is a bottom plan view of another alternate embodiment of the present invention, shown in the closed position.

In an alternate embodiment as shown in FIG. 17, a lock and release mechanism for a fifth wheel king pin embodying the teachings of the subject invention is generally designated as 360. In this embodiment, a piston cylinder unit 362 is directly linked in a continuous extension of the piston rod 364 with handle member 366 extending exteriorly of the housing 369. At the junction between the piston rod and the handle member is connected one end of an elongated handle extension 368 with the opposite end pivotally mounted on pin 370 located within the housing 368.

In FIG. 17, king pin 372 is shown locked in place by jaw member 374 as maintained in position by wedge member 376. A pin 378 extending from the wedge member 376 slidably engages a groove 380 of the elongated handle extension 368 and a groove 382 of a lever member 384. The lever member is also connected by a pin 386 with a bumper member 388.

As explained with respect to the other embodiments of the invention, the mechanism 360 shown in FIG. 17 is in the closed or coupled position. This position is maintained by springs 390, 392 engaging pins 378 and 386, respectively, as well as by the retraction of the piston cylinder unit 362 to hold the handle extension 368 in place. The piston rod of the piston cylinder unit 362 is extended to retract the jaw member and the wedge member from the throat 394. The force exerted by the piston rod of the piston cylinder unit or manual force through the handle member 366 against the bias of the spring 390, 392 and against the spring 396 connected to the bumper member 398 moves the wedge member by the connection of the handle extension member 368 and the wedge member through pin 378. When the wedge member contacts jaw member extension 398, the jaw member is also retracted.

During the movement of the wedge member, pressure against plunger 400 of microswitch 402 provides an electrical indication in the cab of the tractor trailer that the wedge has been moved. Similarly when the king pin 372 is moved, plunger 404 of microswitch 406 is released to also indicate a movement of the king pin from the desired set position.

As will be noted, the micro-switches for indicating the proper positioning of the king pin and the wedge member are incorporated into the embodiment shown in FIG. 11 through 17 and operate in a manner as disclosed with respect to FIG. 4 through 6.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A lock and release mechanism for a fifth wheel, said lock and release mechanism comprising:

a housing having a throat for receipt of a fifth wheel king pin, a jaw member slidably mounted in said housing for engagement with said king pin, said jaw member including a pin member secured thereto, a wedge member slidably mounted in said housing for engaging said jaw member and locking said jaw member in engagement with said king pin, said wedge member including a pin member secured thereto, a lever member having a slot and said lever member interconnecting said wedge member and said jaw member, said lever member being pivotally mounted on said pin member of said jaw member and said pin member of said wedge member being slidably mounted in said slot of said lever member, a bumper member for initially extending into said throat and for being pushed out of said throat by said king pin entering said throat and being biased toward entry into said throat upon unlocking of said king pin by said jaw member, a handle member extending through said housing, said handle member having two ends with one end located exteriorly of the housing, and a handle extension connected to the other end of said handle member within said housing, said handle extension being pivotally mounted in said housing, said bumper member being pivotally mounted on said handle extension and said handle extension being pivotally connected with said pin member of said wedge member for movement of said wedge member only upon movement of said handle member.

2. A lock and release mechanism as claimed in claim 1, wherein said handle member includes a threaded portion located externally of said housing.

3. A lock and release mechanism as claimed in claim 2, wherein a nut is threadingly mounted on said threaded portion for rotation and movement of said wedge member.

4. A lock and release mechanism as claimed in claim 1, wherein an electrical switch is positioned in said housing to indicate a position of said wedge member.

5. A lock and release mechanism as claimed in claim 1, wherein a piston-cylinder unit is connected to said handle extension.

6. A lock release mechanism as claimed in claim 1, wherein said jaw member and said wedge member have straight contact surfaces.

7. A lock and release mechanism for a fifth wheel, said lock and release mechanism comprising:

a housing having a throat for receipt of a fifth wheel king pin, a jaw member slidably mounted in said housing for engagement with said king pin when said king pin is in said throat, said jaw member including a pin member secured thereto, a wedge member slidably mounted in said housing for engaging said jaw member and locking said jaw member in engagement with said king pin, said wedge member including a pin member secured thereto, a lever member having a slot and said lever member interconnecting said wedge member and said jaw member, said lever member being pivotally mounted on said pin member of said jaw member and said pin member of said wedge member being slidably mounted in said slot of said lever member, a bumper member pivotally mounted on said pin member of said jaw member for initially extending into said throat and for being pushed out of said throat by said king pin entering said throat and being biased toward entry into said throat upon unlocking of said king pin by said jaw member, at least one spring structure engaging said pin member of said wedge member and said pin member of said jaw member for biasing said jaw member and said wedge member to lock said king pin in said throat, a handle member extending through said housing, said handle member having two ends with one end located exteriorly of the housing, and a handle extension having a slot and said handle extension being connected to the other end of said handle member within said housing, said handle extension being pivotally mounted in said housing and said pin member of said wedge member slidingly engaging sidewalls of said slot of said handle extension for movement of said wedge member only upon movement of said handle member.

8. A lock and release mechanism as claimed in claim 7, wherein said handle member includes a threaded portion located externally of said housing.

9. A lock and release mechanism as claimed in claim 8, wherein a nut is threadingly mounted on said threaded portion for rotation and movement of said wedge member.

10. A lock and release mechanism as claimed in claim 7, wherein an electrical switch is positioned in said housing to indicate a position of said wedge member.

11. A lock and release mechanism as claimed in claim 7, wherein at least one spring structure engages a connection between said wedge member and said lever member and a connection between said jaw member and said lever member.

12. A lock and release mechanism as claimed in claim 10, wherein a piston-cylinder unit is connected to said handle extension.

13. A lock release mechanism as claimed in claim 7, wherein said jaw member and said wedge member have straight contact surfaces.

* * * * *